Patented Jan. 15, 1935

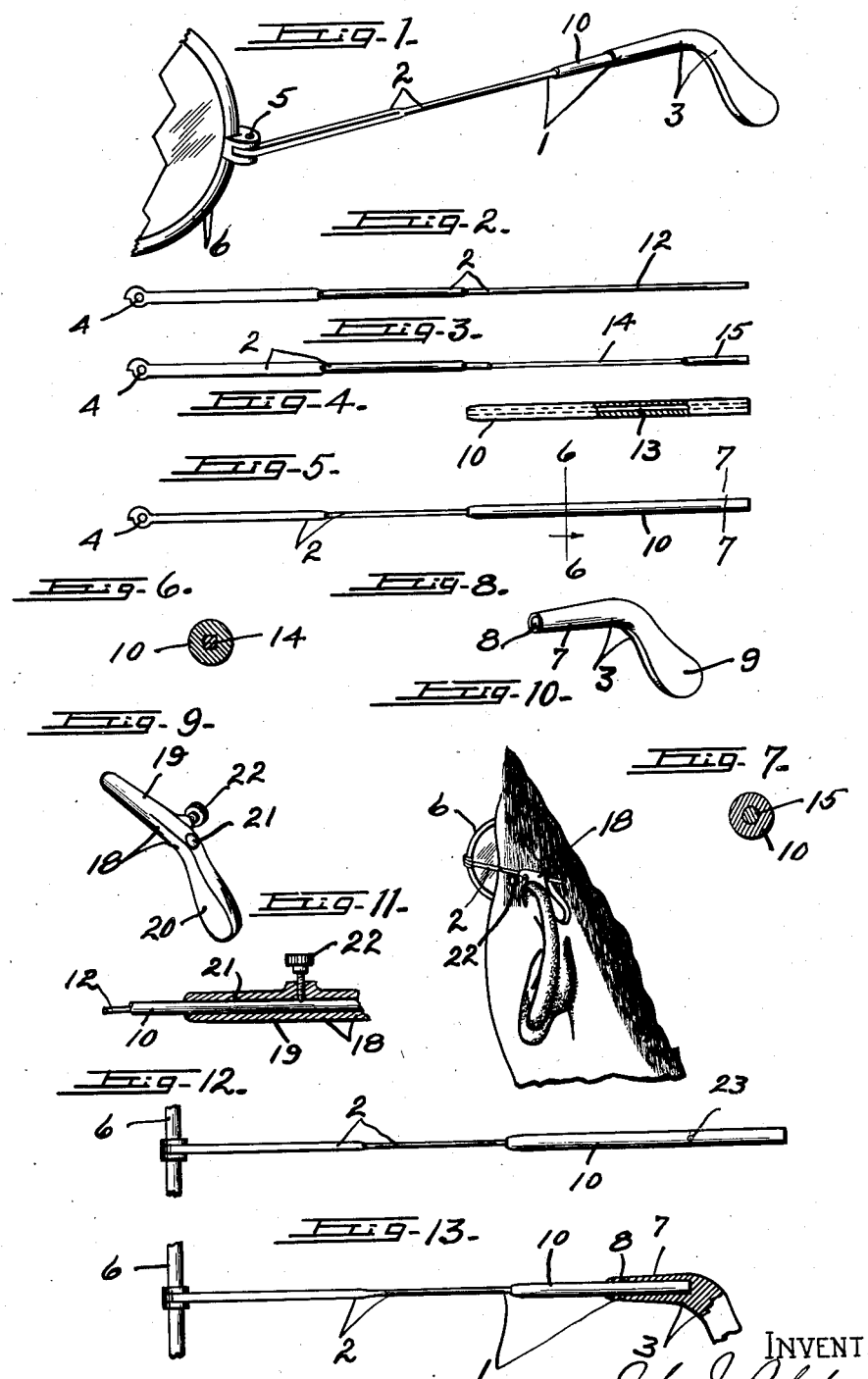

1,988,423

UNITED STATES PATENT OFFICE 1,988,423

SPECTACLE TEMPLE AND METHOD OF MAKING THE SAME

John J. Rohrback, Rochester, N. Y., assignor to Shuron Optical Company, Inc., Geneva, N. Y., a corporation of New York Application June 17, 1932, Serial No. 617,709

6 Claims. (Cl. 88—52)

This invention relates to certain new and useful improvements in spectacle temples and method of making the same.

This invention pertains more particularly to an adjustable temple of the short skull form-fitting type and which consists of a metallic bar having the usual eye at one end for permitting the temple to be pivotally secured to a spectacle frame and a non-metallic tip secured to the opposite or free end of the bar and adapted to closely fit the skull of the user. A short skull temple being one in which its free end terminates just over the top of the ear has for years been considered as having particular merit for both male and female wearers. It is particularly advantageous as a lady's temple not only for fitting comfort but also for the ease of putting on and taking off without disturbing the hair arrangement or requiring the removal of the hat, all of which makes this type of temple the ideal prescription in this field.

Further, the desirable use of a non-metallic tip is accompanied with the objection that it is difficult, if not commercially impractical, for an optician to permanently secure such a tip, made for instance of zylonite or the like, to a metallic temple bar.

As a short skull temple is one which does not fit down around the back of the ear but is one that extends only a short distance behind the ear and has an enlarged portion or tip which fits into a recess just behind the ear toward the top thereof, it is necessary that this type of temple be very accurate in length to hold the spectacles firmly in place. Furthermore, due to the fact that the distance from the front of the face where the spectacle frame is located to the point terminating just over the top of the ear where the temple tip presses against the skull, varies to a considerable degree in different persons and also that this distance at the right and left sides varies in some instances with an individual, it is quite necessary that these temples be custom-fitted to the particular patient.

It has been determined by extensive experiments that this class of temple must not possess over a small fraction of an inch in play. Unlike a temple that embraces the whole of the back of the ear and can vary one-quarter of an inch either way without discomfort, the success of a short skull temple lies in its ability to be fitted and stay fitted. A rigid construction to present accurate fitting would require at least twelve sizes to cover a fitting range of one and one-half inches, also right and left sides. This stock problem has always heretofore been a burden to the dealer and a deterrent to this temple's popularity.

The main object of this invention is to provide a spectacle temple of the short skull form-fitting type which may be readily fitted by one ordinarily skilled in the business to the prescription of each individual.

A further object is to provide a temple of the above-mentioned class which is equally adapted to the right and left sides and to the different lengths required.

Other objects are to provide a temple which is light, durable and economical in construction, one that will afford a maximum degree of comfort to the user and which will present a neat and attractive appearance.

In carrying out the above-mentioned objects, I have provided a temple having a substantially straight body or bar portion provided with an aperture at one end to enable the same to be pivotally connected with a spectacle frame in the conventional manner. The body is symmetrically constructed so as to be equally adapted for use at both right and left sides and is of sufficient length to cover the maximum requirements.

In order that the required length of the temple body may be readily ascertained, I have provided a novel temple tip or gauge which is so constructed that it may be slidably mounted on the free end of the temple body so that when applied to the patient, this gauge may be caused to take the position the permanent tip must assume to firmly maintain the spectacle frame in the proper position.

The temple body is then suitably marked to register the proper length thereof for the particular patient after which the gauge is removed, the temple bar cut to the required length and then a permanent tip is fixedly secured to the temple bar at the severed end thereof.

Other objects and advantages relating to the details of the construction and the relation of the parts thereof, and to the exact manner of fitting the same, will more clearly appear from the following description taken in connection with the accompanying drawing in which:

Figure 1 is a perspective view of my novel temple shown hinged to a spectacle frame.

Figure 2 is a plan view of the temple bar having its free end reduced in diameter for receiving a tip-supporting sleeve thereon.

Figure 3 is a view similar to Figure 2 with the reduced portion of the bar suitably scored for fixedly maintaining the sleeve on the bar.

Figure 4 is a side elevation partly in section, of a non-metallic sleeve adapted to be pressed on the free end of the temple bar over the scored portion thereof.

Figure 5 is a plan view of the temple bar with the sleeve mounted thereon.

Figures 6 and 7 are enlarged transverse sectional views taken respectively on lines 6—6 and 7—7, Figure 5.

Figure 8 is a perspective view of a non-metallic tip adapted to be fixedly mounted on the non-metallic sleeve.

Figure 9 is a perspective view of a metal tip or gauge adapted to be temporarily mounted on the sleeve for determining the required length of the temple bar.

Figure 10 is a perspective view illustrating a temple bar with the gauge mounted thereon, and the manner of supplying the same to a patient for determining the length of the bar.

Figure 11 is an enlarged detail longitudinal sectional view through the metal tip or gauge with a portion of the temple bar and sleeve operably mounted therein.

Figure 12 is a side elevation of the temple bar indicating the manner in which the same is marked at the place where the bar is to be cut off.

Figure 13 is a side elevation of the cut temple bar with a portion of the permanent tip indicated thereon, a portion of the tip being shown in section to show the adjacent end of the bar.

My novel design of spectacle and eye-glass temple 1 consists primarily of a bar 2 and a tip 3. The bar 2 is preferably a metallic bar composed of gold, silver or the like, and is provided with an aperture 4 at one end for receiving a pivotal pin or screw 5 adapted to secure the temple to a spectacle frame or mounting as 6 in the conventional manner.

The temple bar 2 is, as shown, substantially symmetrical in longitudinal section so as to be equally adapted for right and left sides, while the length of the bar is such that it will readily meet the maximum requirements.

The temple tip 3 is preferably composed of a non-metallic material such as celluloid or zylonite, and consists of a body portion 7 having a central opening 8 extending inwardly from one end thereof and adapted to receive the outer end of the bar 2 therein. The opposite end portion of the body 7 extends downwardly and outwardly to form a skull-engaging portion 9 which is so shaped that when brought to bear against the skull, it will conform to the contour of the skull at the required place and give a maximum degree of comfort to the wearer.

Inasmuch as it is difficult, as well as impractical, for opticians or others out in the field to permanently secure the celluloid or zylonite tips 3 to the metal temple bars 2 when fitting the patient, each bar 2 is provided with a non-metallic sleeve 10 which is preferably composed of transparent or nearly transparent celluloid, zylonite or the like so that the sleeve is rendered practically invisible at a relatively short distance.

In order that the wall of the sleeve 2 may be of satisfactory thickness without the temple having a bulky cumbersome appearance, the outer free end portion 12 of the bar 2 may be reduced in cross-sectional area, as shown in Figure 2. The opening 13 extending longitudinally through the sleeve 10 is of such a size as to tightly receive the portion 12 of the bar 2 therein.

The portion 12 of the bar 2 and the sleeve 10 are each of such a length that the tip 3 will always be mounted on the sleeve when permanently fixed to the sleeve, whether maximum or minimum length of the temple is required. In order that the sleeve 10 may be permanently and simply held on the temple bar 2 when forced thereon, the surface of the bar intermediate the ends of the reduced portion 12 may be scored or roughened in any convenient manner and which, as illustrated at 14, Figure 3 may consist in the bar being squared or non-circularized by pressure so that certain portions as the corners thus formed will extend a relatively short distance beyond the plane of the surface of the remaining or end portions 15 of the reduced portion 12 for engaging the wall of the opening 13 of the sleeve 10 and thereby sufficiently engage the sleeve 10 to maintain the sleeve on the bar under all working conditions and prevent its being readily removed.

It is now obvious, inasmuch as the temple bar has the rear or free end portion thereof covered with the celluloid sleeve 10 and as celluloid may be quickly and easily cemented or fused to celluloid by using a nitro-cellulose cement or solvent, that the tips 3 may be readily and simply secured to the temple bars 2 at the time the bars are being fitted for length to the patient and as the tips 3 are made both right and left, it is a simple matter for anyone to apply the tips to the bars at the time of fitting the patient.

In order that the lengths of the bars may be readily ascertained for each individual application, I have provided a metal tip or gauge 18 shown in Figure 9. This tip may be composed of brass, nickel plate or other suitable material, and has substantially the same size and contour as the permanent non-metallic tips 3. These gauge tips 18 are made up in pairs adapted to fit the right and left side of the head.

The tip gauges 18 consist of a tubular body portion 19 which terminates at one end in a pendent portion 20 shaped like the corresponding portion 9 of the tip 3 so as to comfortably engage the skull. The longitudinal opening as 21 in the body 19 is of sufficient size to readily receive the temple sleeve 10 therein, and this opening extends longitudinally through the body 19 so that the gauge may be moved to any required position along the bar 2 and so that the rear end of said bar may extend beyond the gauge 18 if so required during the fitting of the temples to the patient.

The gauge 18 is also provided with a set screw 22 screw-threaded in the outer wall of the body 17 a distance from the forward end thereof that when screwed into contact with the non-metallic sleeve 10, it will mark or score said sleeve as at 23, Figure 12, and accurately indicate the required length of the temple bar.

It will now be clearly understood that an optician, for instance, with a quantity of the temple bars 2 having the zylonite sleeves 10 secured thereon and a stock of right and left non-metallic tips 3 together with a pair of metal gauge tips and a small quantity of solvent, may quickly and accurately fit any and all patients in such a manner as to give the greatest amount of comfort and satisfaction.

The manner of applying my novel temples may be described as follows:

A couple of the bars 2 are first pivotally secured by screws or pins 5 to the spectacle frame or mounting 6, one bar being positioned at each side of the frame. A gauge tip 18 is then mounted on each bar and the frame placed in position at the front of the face. Each gauge is then adjusted along the respective bar until a perfect fit is obtained, as indicated in Figure 10, and then the set screws 22 are threaded inwardly until they contact with the respective non-metallic sleeve 10 thereby marking the sleeve as at 23 and indicating the proper length of the bars for that particular application. The frame is then removed from the patient and the gauges 18 removed from the temple bars 2 after which the bars may be cut off with any convenient instrument such as a pair of cutting pliers at the points marked on the sleeves by the set screws. The non-metallic tips 3 are then mounted on the ends of the cut bars and fused to the sleeves by first applying a small quantity of solvent to the sleeve or to the surface of the tip openings 8 and then by pressing the tips on a respective bar until the end of the bar engages the bottom of the respective openings 8 in which position the tips will be secured at the same distance from the shaft 5 as the gauge tips 18 were when the sleeves were marked by the set screws, thereby insuring the proper length of the temple.

After the solvent has set, each temple bar may be sufficiently twisted if necessary, with flat jaw pliers near the joint to obtain a snug head form fit of the tips.

It is now obvious that this construction produces a short skull form-fitting temple which will provide for an accurate fitting of the frame and produce the maximum degree of comfort to the wearer, and although I have shown and particularly described the preferred embodiment of my invention, I do not wish to be limited to the exact form, construction and arrangement of the parts thereof as various changes may readily be made without departing from the spirit of this invention, as set forth in the appended claims.

I claim:

1. A short skull spectacle temple comprising a metallic temple bar, an aperture at one end of said bar adapted for connection to a spectacle mounting, a non-metallic sleeve of uniform cross-section extending part way along said bar from the other end thereof and permanently secured thereto, a non-metallic short skull temple tip provided with an aperture at its forward end adapted to receive said sleeve, said sleeve extending into said aperture and being cemented therein.

2. A short skull spectacle temple comprising a metallic temple bar, an aperture at one end of said bar adapted for connection to a spectacle mounting, said bar having a scored surface extending from its other end part way along its length, a non-metallic sleeve of uniform cross-section pressed on said bar over said scored surface, whereby said sleeve is permanently secured to said bar, and a non-metallic short skull temple tip provided with an aperture at its forward end adapted to receive said sleeve, said sleeve extending into said aperture and being cemented therein.

3. A short skull spectacle temple comprising a metallic temple bar, an aperture at one end of said bar adapted for connection to a spectacle mounting, said bar having a reduced portion extending from its other end part way along its length, a non-metallic sleeve of uniform cross-section over said reduced portion and permanently secured thereto, and a non-metallic short skull temple tip provided with an aperture at its forward end adapted to receive said sleeve, said sleeve extending into said aperture and being cemented therein.

4. A short skull spectacle temple comprising a substantially straight metallic bar, an aperture at one end of said bar adapted for connection to a spectacle mounting, said bar having a reduced portion extending from its other end part way along its length, the surface of said reduced portion being scored, a non-metallic sleeve of uniform cross-section pressed on said bar over said reduced portion and permanently secured thereto, said bar being adapted to be cut off at a point on said sleeve when fitted to the patient, and a non-metallic short skull temple tip provided with an aperture at its forward end adapted to receive said sleeve, said sleeve extending into said aperture and being cemented therein.

5. The method of making a short skull spectacle temple which comprises providing a metal bar of greater length than that required to form a temple and having an aperture at one end adapted for connection to a spectacle mounting, permanently securing a non-metallic sleeve of uniform cross-section over the rear portion only of said bar, ascertaining the length of bar required for the individual temple, cutting off the bar to said length at a point on said sleeve, and cementing a non-metallic short skull temple tip over said sleeve at the severed end.

6. The method of making a short skull spectacle temple which comprises providing a substantially straight metal bar of greater length than that required to form a temple and having an aperture at one end adapted for connection to a spectacle mounting, said bar having a reduced portion extending from its other end part way along its length, scoring the surface of said reduced portion, pressing a non-metallic sleeve of uniform cross-section over the reduced portion only of said bar, ascertaining the length of bar required for the individual temple, cutting off the bar to said length at a point on said sleeve, and cementing a non-metallic short skull temple tip over said sleeve at the severed end.

JOHN J. ROHRBACK.